United States Patent [19]

Nishio

[11] Patent Number: 5,537,625
[45] Date of Patent: Jul. 16, 1996

[54] AUTOMATIC DISC CHANGER WITH DISC REPRODUCING AND RECORDING MECHANISM EMPLOYING DISC SELECT AND CONTROL SCHEME

[75] Inventor: Mamoru Nishio, Kanagawa, Japan

[73] Assignee: Sony Corporation, Tokyo, Japan

[21] Appl. No.: 520,476

[22] Filed: Aug. 29, 1995

Related U.S. Application Data

[63] Continuation of Ser. No. 252,546, Jun. 1, 1994, abandoned, which is a continuation of Ser. No. 27,613, Mar. 2, 1993, abandoned, which is a continuation of Ser. No. 491,529, Mar. 12, 1990, abandoned.

[30] Foreign Application Priority Data

Mar. 10, 1989 [JP] Japan ...................................... 1-56385

[51] Int. Cl.⁶ .................................................. G06F 12/00
[52] U.S. Cl. ................... 395/441; 364/DIG. 1; 364/236.2; 364/248.1; 364/238.4
[58] Field of Search ............................ 364/200 MS File, 364/900 MS File; 395/438, 439, 441, 442, 404; 360/98.04; 369/30, 178

[56] References Cited

U.S. PATENT DOCUMENTS

| | | | |
|---|---|---|---|
| 3,629,860 | 12/1971 | Capozzi | 395/404 |
| 3,634,830 | 1/1972 | Baskin | 395/311 |
| 3,810,239 | 5/1974 | Kozu et al. | 360/92 |
| 3,999,163 | 12/1976 | Lery et al. | 395/182.03 |
| 4,490,784 | 12/1984 | Ives et al. | 395/250 |
| 4,577,272 | 3/1986 | Ballew et al. | 395/650 |
| 4,612,613 | 9/1986 | Gershenson et al. | 395/894 |
| 4,734,851 | 3/1988 | Director | 395/479 |
| 4,734,898 | 3/1988 | Morinaga | 369/39 |
| 4,747,047 | 5/1988 | Coogan et al. | 395/858 |
| 4,754,344 | 6/1988 | Shoji et al. | 360/48 |
| 4,766,581 | 8/1988 | Korn et al. | 369/30 |
| 4,780,905 | 10/1988 | Cruts et al. | 380/44 |
| 4,805,090 | 2/1989 | Coogan | 395/894 |
| 4,825,403 | 4/1989 | Gershenson et al. | 360/52 |
| 4,827,462 | 5/1989 | Flannagan et al. | 369/32 |
| 4,849,929 | 7/1989 | Timsit | 395/182.03 |
| 4,888,691 | 12/1989 | George et al. | 395/700 |
| 4,910,614 | 3/1990 | Arai et al. | 360/69 |
| 5,025,431 | 6/1991 | Naito | 369/36 |
| 5,072,378 | 12/1991 | Manka | 395/182.04 |
| 5,097,439 | 3/1992 | Patriquin et al. | 395/402 |
| 5,133,060 | 7/1992 | Weber et al. | 395/440 |
| 5,148,432 | 9/1992 | Gordon et al. | 371/10.1 |
| 5,150,465 | 9/1992 | Bush et al. | 395/834 |
| 5,218,689 | 6/1993 | Hotle | 395/441 |

FOREIGN PATENT DOCUMENTS

| | | |
|---|---|---|
| 59-135660 | 1/1983 | Japan . |
| 59-207462 | 5/1983 | Japan . |

*Primary Examiner*—Matthew M. Kim
*Attorney, Agent, or Firm*—Jay H. Maioli

[57] ABSTRACT

A disc selecting and controlling method for selectively controlling at least one automatic disc changer adapted to selectively take out plural disc-shaped recording media to record and/or reproduce the recording media on at least one disc drive, and at least one disc recording and/or reproducing apparatus adapted to record and/or reproduce at least one disc-shaped recording medium, from a host computer by a disc controller. The disc drive device or the disc-shaped recording and/or reproducing device is switchingly selected by a hardware technique by a selection signal transmitted over a selection signal line of the disc controller, and the automatic disc changer performing a switching selection by a software technique by a command from the disc controller deems the disc-shaped recording media to be a virtual disc drive or disc recording and/or reproducing apparatus.

3 Claims, 3 Drawing Sheets

AUTOMATIC DISC CHANGER WITH DISC REPRODUCING AND RECORDING MECHANISM EMPLOYING DISC SELECT AND CONTROL SCHEME

This is a continuation of application Ser. No. 08/252,546 filed Jun. 1, 1994, now abandoned, which is a continuation of application Ser. No. 08/027,613 filed Mar. 2, 1993, now abandoned, which is a continuation of application Ser. No. 07/491,529 filed Mar. 12, 1990, now abandoned.

BACKGROUND OF THE INVENTION

1. Field of the Invention

This invention relates to a disc selecting and controlling method. More particularly, it relates to a disc selecting and controlling method in which one or more disc devices, such as a disc recording/reproducing device or a disc recording medium, is selected from a host computer by way of a disc controller.

2. Prior Art

In general, for selecting and controlling a plurality of disc devices from a host computer by way of a disc controller, a system having the structure as shown for example in FIG. 1 is employed.

Referring to FIG. 1, a host computer 11 is connected by way of interfacing buses, such as GPIB or SCSI, to one or more disc controllers 12, to which one or more disc driving devices or disc drives 13 are connected in a so-called daisy chain connecting configuration by way of drive interfacing buses. In this case, it may be confirmed from the host computer 11 that disc drives 13 exist physically by the interposition of disc controllers 12. It is however presupposed that a disc 14 is allocated to each disc drive 13 without regard to whether the disc is detachable or fixed.

As the disc drive 13, a floppy disc device or a hard disc device has been employed. Recently, a disc reproducing apparatus of the so-called CD-ROM standard employing a small-sized optical digital audio disc as the ordinary digital data recording medium, or a disc reproducing device of the disc as the magneto-optical recording medium, also have come to be employed.

With a consumer player for a small-sized optical digital audio disc, since an inexpensive automatic disc changer in which preset discs may be exchanged automatically for reproduction, as shown for example in the U.S. Pat. No. 4,614,474, is available, the automatic disc changer unit may be applied to the CD-ROM standard disc drive at reduced costs.

When an automatic disc changer, in which plural preset discs are changed automatically for recording and/or reproduction, is used in conjunction with the above described disc selecting and controlling system, unity in the control from the controller 12 would be lost if the automatic changer is connected by way of the disc controller 12 according to the daisy chain connecting configuration. For this reason, as shown in FIG. 1, the automatic changer 20 is connected to an interfacing bus from the host computer 11. In this automatic disc changer 20, there are provided one or more disc drives 21, a number of discs 22 larger than the number of disc drives 21 and a disc exchange control device 23. This is substantially tantamount to connecting the same number of disc drives as the number of the discs 22 by exchanging and attaching the discs 22 to the disc drives 21 by the disc exchange control device 23. Thus, in the automatic disc changer, the discs may also be used as the disc devices in the broad sense of the term.

However, with such conventional system, since the automatic disc changer 20 is directly coupled to the host computer 11, it becomes necessary to provide a disc controller 24 in the automatic changer 20, which is dedicated to the changer, while the control to bring about the same operation as that of the other disc controller 12 from the host computer 11 becomes complicated.

Hence, the automatic disc changer 20 becomes costly to the extent that the disc controller 24 dedicated to the changer and the complicated control software are necessitated. Even if application could be made to the professional system, application to a consumer or personal system can be realized only with difficulty due to the costs, despite the fact that inexpensive automatic disc changers are available for use in conjunction with consumer optical digital audio discs.

OBJECTS AND SUMMARY OF THE INVENTION

In view of the foregoing, it is a principal object of the present invention to provide a disc selecting and controlling method whereby a disc device such as the above mentioned automatic disc changer, in which a plurality of disc devices in the broad sense of the term, such as the disc-shaped recording media, are enclosed so as to be selected arbitrarily, may be controlled in a unified fashion from the host computer by means of the disc controller.

For accomplishing the above object, the present invention provides a disc selecting and controlling method in which one or more disc devices are selected and controlled by means of a disc controller from the side of the host computer, wherein said disc devices comprise physical devices and logical devices, said logical devices being contained in said physical devices when viewed from said host computer, said physical devices are switchingly selected by a hardware technique by a selection signal transmitted over a selection signal line of the disc controller and the logical devices are switchingly selected by a software technique by a command transmitted from said disc controller over a command bus.

In accordance with the above described disc selecting and controlling method, selection control of the disc devices from the host computer may be made in a unified manner by hierarchical designation of the physical and logical devices. That is, whilst the physical disc devices are selected by a hardware technique, that is by a selection signal transmitted over a selection signal line, the logical disc devices may be switchingly selected by a software technique, that is, by a command of a software program, for simplifying the construction, that is hardware, and the operation, that is software. For example, disc selection control at the time of the connection of the automatic disc changer may be made in the same unified manner as for the ordinary disc drive. Hence, a disc controller dedicated to the automatic disc changer or the software for realizing a complicated operation need not be provided in the automatic disc changer, so that the automatic disc changer may be simplified in structure and lowered in costs.

The above and other objects of the present invention will become more apparent from the following description of the preferred embodiments of the invention and the appended claims.

DETAILED DESCRIPTION OF THE EMBODIMENT

Figure 2:
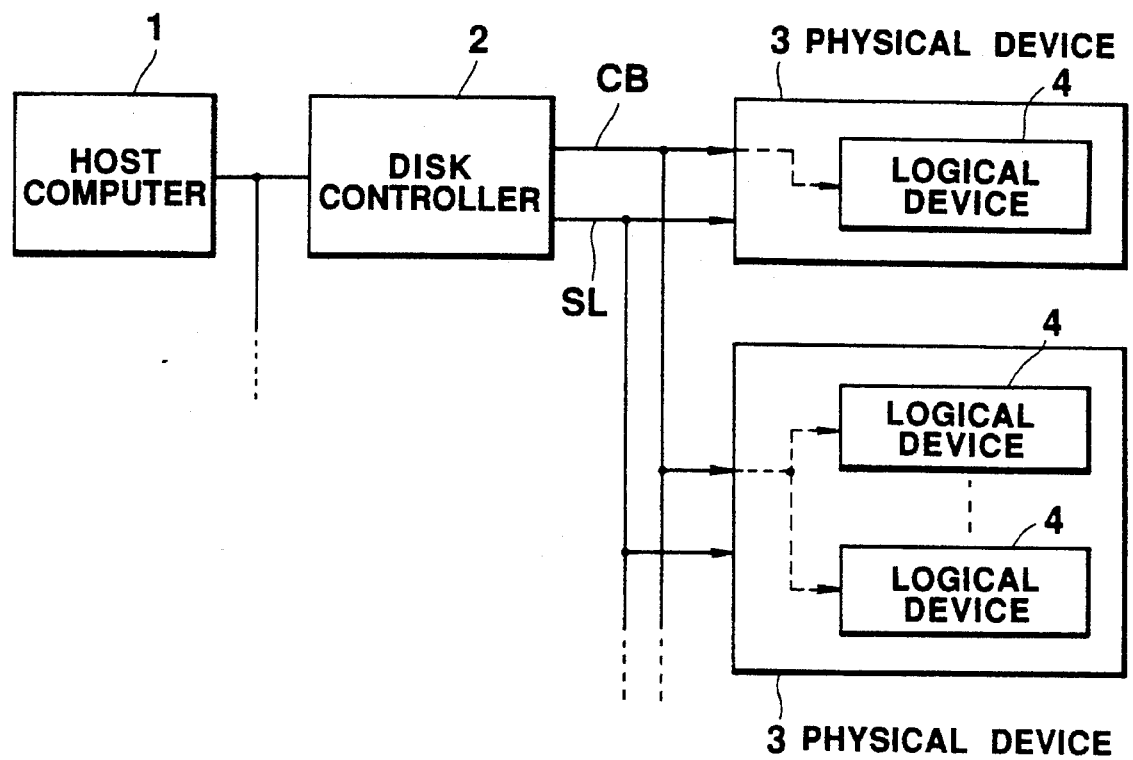
FIG. 2 is a block diagram for illustrating the operating principle of the disc selecting and controlling method according to the present invention.

Before proceeding to the description of preferred embodiments of the disc selecting and controlling method of the present invention, the basic operating principle will be briefly explained with reference to FIG. 2.

In this figure, when the present invention is applied to the disc selecting controlling method of selecting and controlling one or more disc devices from a host computer 1 by way of the disc controller 2, the disc device is constituted by physical devices 3 and logical devices 4 and the construction as viewed from the host computer 1 is such that the logical devices 4 are contained in the physical devices 3. The physical devices 3 are selected and switched by hardware means, that is by a selection signal transmitted over a selection signal line SL of the disc controller 2, whereas the logical devices 4 are switched and selected by software means, that is by an instruction or command transmitted from the disc controller 2 over a command bus CB.

In this manner, selection and control of the disc devices from the host computer 1 may be achieved in a unified manner by hierarchically designating the physical devices 3 and the logical devices 4 to simplify both the construction, that is hardware, and the operation, that is software.

Figure 3:
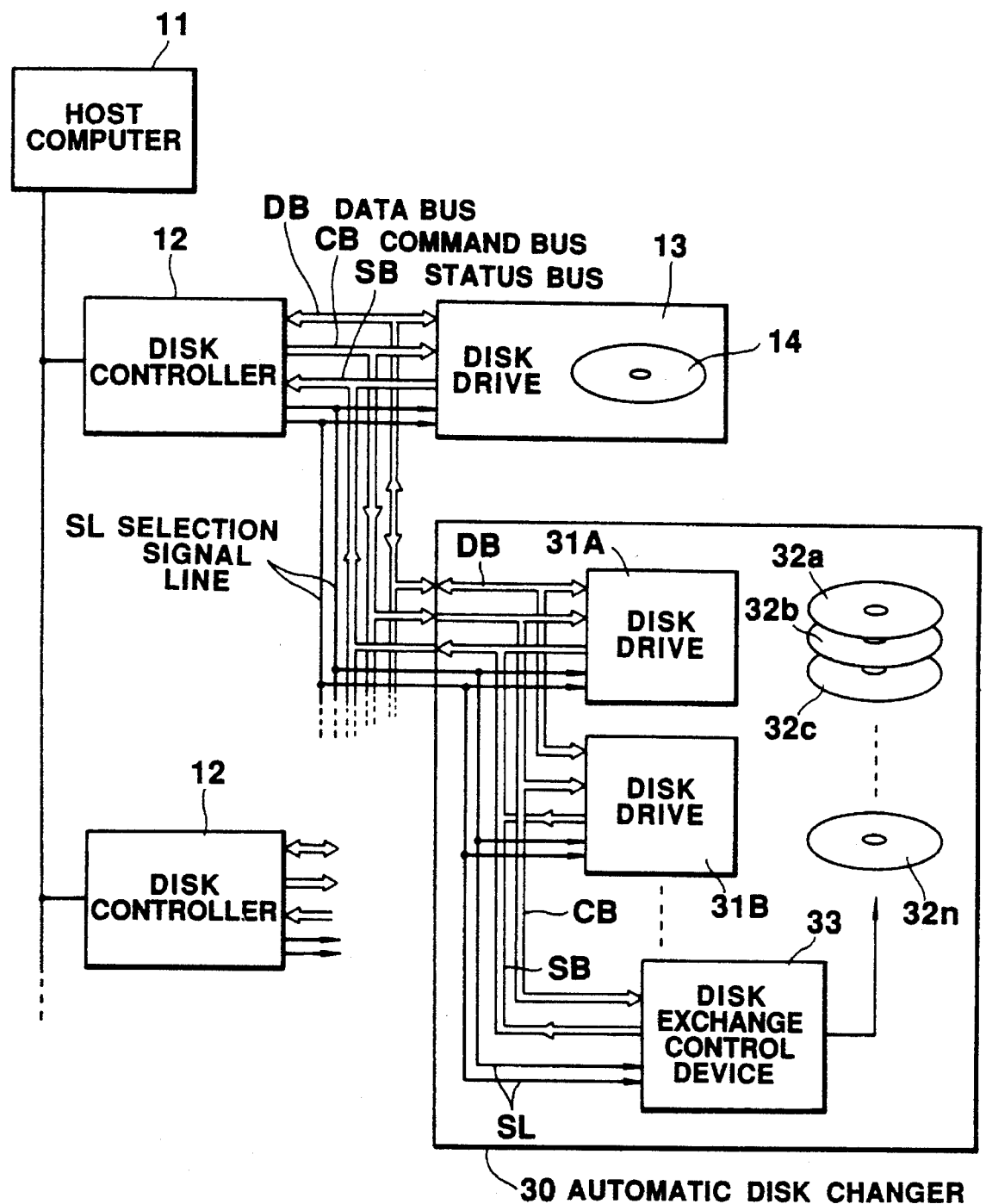
FIG. 3 is a block diagram for illustrating a system to which an embodiment of the disc selecting and controlling method of the present invention is applied.

FIG. 3 is a block circuit diagram showing a system for illustrating a more specific embodiment of the disc selecting and controlling method according to the present invention.

In this figure, one or more disc controllers 12 are connected to host computer 11 by way of interfacing buses, such as GPIB or SCSI. To this disc controller 12, disc driving devices or disc drives 13 as the physical devices and an automatic disc changer 30, more precisely disc drives 31A, 31B, . . . in the disc changer 30, are connected by way of driving interfacing buses in a so-called daisy chain connecting configuration. As the driving interfacing buses between the disc controller 12 and the disc drive 13 or the automatic disc changer 30, there are provided a data bus DB, a command bus CB, a status bus SB and a selection signal line SL.

The disc drive 13 specifically is a floppy disc device or a hard disc device containing a disc-shaped recording medium.

The automatic disc changer 30 has the disc drives 31A, 31B, . . . , as the physical devices, to which desired ones of a plurality of, for example $\underline{n}$ disc-shaped recording media 32a, 32b, 32c, . . . , 32n may be attached exchangeably. This disc exchanging and attaching operation is performed by a disc exchange control device 33. In the specific embodiment of FIG. 3, desired ones of all of the $\underline{n}$ disc-shaped recording media 32a, 32b, 32c, . . . , 32n may be selected by the disc exchange and controlling device 33 for attachment to desired ones of the disc drives 31A, 31B, . . . .

Figure 1:
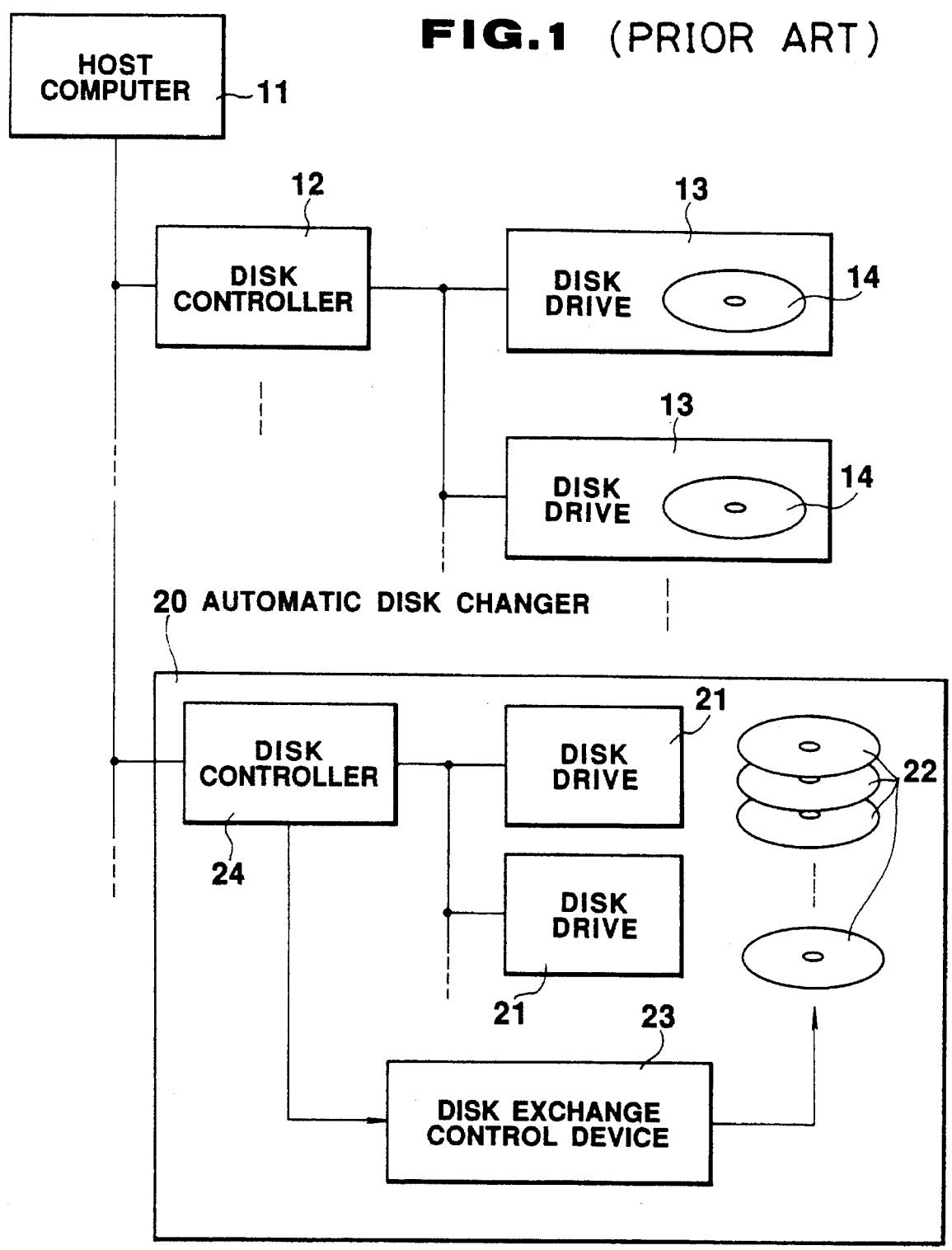
FIG. 1 is a block diagram for illustrating the conventional disc selecting and controlling method.

The data bus DB, command bus CB, status bus SB and the selection signal line SL as the driving interfacing buses are connected between the disc drives 31A, 31B, . . . in the automatic disc changer 30 and the disc controller 12, whereas the command bus CB, the status bus SB and the selection signal line SL are connected between the disc exchange control device 33 and the disc controller 12. In this manner, the conventional disc controller 12 is connected to the drives 31A, 31B, . . . and the disc exchanging and control device 33, without using a disc controller dedicated to the changer, such as controller 24 in FIG. 1, with the exchange disc-shaped recording media 32a, 32b, 32c, . . . , 32n being treated as the logical devices within the physical devices, to simplify the construction and the operation.

That is, the logical devices are defined as virtual or imaginary devices, that is disc drives, which are innate to a physical device. With the present embodiment, by treating the disc-shaped recording media 32a, 32b, . . . , 32n within the automatic disc changer 30 as virtual disc drives, it would appear from the host computer as if one or more disc drives exist in the disc drives 31A, 31B, . . . as the physical devices. In a disc drive 13, such as an ordinary floppy disc device, the number of the logical devices, or a disc-shaped recording media 14, is one, which coincides with the number of the disc drives as the physical disc device. With automatic disc changer 30, the number of the actual disc drives 31A, 31B, . . . is equal to the number of the physical disc devices. The number $\underline{n}$ of the exchangeable disc-shaped recording media 32a, 32b, 32c, . . . , 32n contained in the changer is thought to be equal to the number of the logical disc devices possessed by the respective physical devices, that is, disc drives 31A, 31B, . . . , in other words, the number of the virtual disc drives. Selection of the logical devices may be made by the command of a software program under the condition that the physical devices have been selected.

Figure 4:
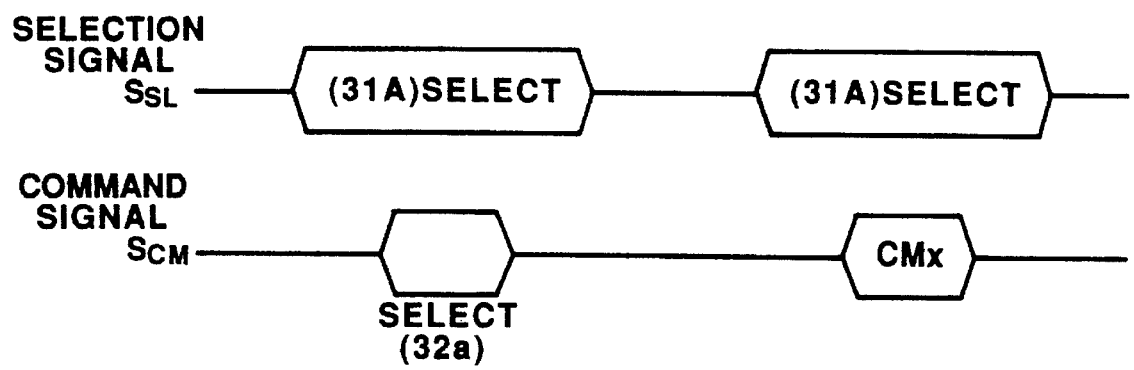
FIG. 4 is a timing chart showing the selection signals and the command signals.

Thus the physical disc device is selected by a selection signal $S_{SL}$ of FIG. 4 transmitted from the disc controller 12 of FIG. 3 over disc drive selection signal line SL, while the logical disc device is selected by the command signal $S_{CM}$ of FIG. 4 transmitted over command bus CB. For example, in accessing the first disc of FIG. 4, the disc drive 31A, which is the physical device in the automatic disc changer 30, is selected by the selection signal $S_{SL}$, while the disc-shaped recording medium 32a, for example, which is the logical device in the physical device, is selected by issuing a logical device selection signal as the command signal $S_{CM}$. Then, until a new logical device selection command is issued to the same physical device or drive 31A, selection of the same physical device or drive 31A results in selection of the logical device selected previously, that is the disc-shaped recording medium 32a. Hence, when the disc drive 31A is selected by the selection signal $S_{SL}$ at the time of the accessing of the next disc of FIG. 4, and an arbitrary command $CM_x$ other than the logical device selection signal is issued, this command $CM_x$ is employed as the command to the disc-shaped recording medium 32a attached within the drive 31A.

With the above embodiment of the disc selecting and controlling method of the present invention, the automatic disc changer 30 may be connected at the level of the disc driving interface and may be handled from the disc controller 12 in the same way as the usual disc drive 13, while the inside of the automatic disc changer 30 may be controlled directly from the host computer 11 or the disc controller 12. Thus the disc controller 24 in FIG. 1 dedicated to the changer, or the complicated control necessary for the changer 30 to behave in the same manner as the usual disc controller, may be eliminated in the automatic disc changer 30, so that the inexpensive automatic disc changer 30 may be provided such as by utilizing a currently available automatic changer for inexpensive consumer optical digital audio discs. Since the physical devices are selected by hardware means by the selection signal line SL, the number of the connected physical devices is limited by the number of the bits of the selection signal. However, since the logical device is selected by software technique by the command of the software program transmitted over the command bus CB, there is no limitation to the number of the physical devices in principle.

The present invention is not limited to the above embodiment. For example, an automatic disc changer having a disc drive and up to several disc-shaped recording media may be employed.

What is claimed is:

1. A disk selecting and controlling method for selecting and controlling an automatic disk changer including a plurality of various disk drives, at least one of the plurality of various disk drives adapted for recording data onto disk-shaped recording media and reproducing data from disk-shaped recording media, and further including a disk exchange control device for controlling the selection of disk-shaped recording media and for controlling the exchange of disk-shaped recording media to and from at least one of the plurality of disk drives included in the automatic disk changer, the disk selecting and controlling method comprising the steps of:

transmitting a selection signal over a selection signal line from a single, solitary disk controller to the automatic disk changer to select at least one of the plurality of disk drives included in the automatic disk changer; and transmitting a command signal over a command signal bus from the single, solitary disk controller to the disk exchange control device to select at least one of a plurality of disk-shaped recording media, each selected disk-shaped recording medium to be exchanged into a corresponding selected disk drive from the plurality of disk drives included in the automatic disk changer, wherein for each selected disk drive the disk exchange control device exchanges a corresponding selected disk-shaped recording medium with a disk-shaped recording medium previously loaded in the selected disk drive, and wherein for each disk drive not selected by the selection signal from the single, solitary disk controller a disk-shaped recording medium previously loaded in the non-selected disk drive remains in the non-selected disk drive.

2. The disk selecting and controlling method as set forth in claim 1, including selecting one of the plurality of disk drives to be a CD-ROM drive.

3. The disk selecting and controlling method as set forth in claim 1, including selecting the quantity of disk-shaped recording media to be greater than the quantity of disk drives.

* * * * *